United States Patent [19]

Kaner et al.

[11] Patent Number: 5,358,556
[45] Date of Patent: Oct. 25, 1994

[54] MEMBRANES HAVING SELECTIVE PERMEABILITY

[75] Inventors: Richard B. Kaner, Beverly Hills; Mark R. Anderson, Los Angeles; Howard Reiss, Encino, all of Calif.; Benjamin R. Mattes, Santa Fe, N. Mex.

[73] Assignee: The Regents of the University of California, Oakland, Calif.

[21] Appl. No.: 988,935

[22] Filed: Feb. 25, 1993

[51] Int. Cl.$^5$ .............................................. B01D 53/22
[52] U.S. Cl. .......................................... 95/45; 95/51; 95/54
[58] Field of Search ........................... 95/45, 51–55; 96/4, 10–14

[56] References Cited

U.S. PATENT DOCUMENTS

| | | | |
|---|---|---|---|
| 3,444,286 | 5/1969 | King et al. | 264/49 |
| 4,026,977 | 5/1977 | Bourganel | 264/41 |
| 4,175,153 | 11/1979 | Dobo et al. | 428/398 |
| 4,268,278 | 5/1981 | Dobo et al. | 264/43 X |
| 4,329,157 | 5/1982 | Dobo et al. | 55/16 |
| 4,451,424 | 5/1984 | Tweddle et al. | 264/216 |
| 4,466,910 | 8/1984 | House et al. | 252/500 |
| 4,466,911 | 8/1994 | House | 252/500 |
| 4,468,411 | 8/1984 | Naarmann et al. | 204/13 |
| 4,472,175 | 9/1984 | Malon et al. | 95/51 |
| 4,483,901 | 11/1984 | Okita et al. | 428/315.5 |
| 4,485,056 | 11/1984 | Makino et al. | 264/41 |
| 4,486,202 | 12/1984 | Malon et al. | 96/13 |
| 4,505,845 | 3/1985 | House | 252/500 |
| 4,505,846 | 3/1985 | House et al. | 252/500 |
| 4,512,893 | 4/1985 | Makino et al. | 210/500.2 |
| 4,519,940 | 5/1985 | Schroeder et al. | 252/500 |
| 4,615,829 | 10/1986 | Tamura et al. | 524/422 X |
| 4,620,943 | 11/1986 | Denisevich, Jr. et al. | 252/518 |
| 4,629,540 | 12/1986 | Geniees et al. | 204/59 R |
| 4,636,314 | 1/1987 | Beuhler et al. | 210/500.25 |
| 4,652,396 | 4/1987 | Wagener | 252/500 |
| 4,657,564 | 4/1987 | Langsam | 95/51 |
| 4,664,681 | 5/1987 | Anazawa et al. | 96/10 |
| 4,692,225 | 9/1987 | Witucki et al. | 427/58 X |
| 4,717,393 | 1/1988 | Hayes | 210/500.39 |
| 4,717,394 | 1/1988 | Hayes | 210/500.39 X |
| 4,756,835 | 7/1988 | Wilson | 95/45 X |
| 4,759,776 | 7/1988 | Langsam et al. | 95/51 |
| 4,761,233 | 8/1988 | Linder et al. | 210/500.38 X |
| 4,784,880 | 11/1988 | Coplan et al. | 427/245 |
| 4,798,685 | 1/1989 | Yaniger | 252/500 |
| 4,800,019 | 1/1989 | Bikson et al. | 210/321.8 |
| 4,806,271 | 2/1989 | Yaniger et al. | 252/500 |
| 4,813,983 | 3/1989 | Nohmi et al. | 428/378 X |
| 4,818,452 | 4/1989 | Kneifel et al. | 210/500.39 |
| 4,822,638 | 4/1989 | Yaniger | 427/79 |
| 4,828,585 | 5/1989 | Chiao | 95/51 X |
| 4,832,713 | 5/1989 | Yamada et al. | 210/490 X |
| 4,851,487 | 7/1989 | Yaniger et al. | 525/540 |
| 4,859,215 | 8/1989 | Langsam et al. | 95/51 |
| 4,859,384 | 8/1989 | Fibiger et al. | 264/45.1 |
| 4,973,391 | 11/1990 | Madou et al. | 204/78 |
| 4,976,860 | 12/1990 | Takahashi et al. | 210/500.28 |
| 4,990,255 | 2/1991 | Blume et al. | 96/13 X |
| 5,013,338 | 5/1991 | Anand et al. | 95/54 X |
| 5,045,357 | 9/1991 | Motonaga et al. | 96/13 X |
| 5,067,970 | 11/1991 | Wang et al. | 95/51 |

(List continued on next page.)

FOREIGN PATENT DOCUMENTS

| | | | |
|---|---|---|---|
| 3831970A1 | 3/1990 | Fed. Rep. of Germany . | |
| 58-223405 | 12/1983 | Japan | 96/4 |
| 58-223406 | 12/1983 | Japan | 96/4 |
| 58-223407 | 12/1983 | Japan | 96/4 |
| 58-223408 | 12/1983 | Japan | 96/4 |
| 58-223409 | 12/1983 | Japan | 96/4 |
| 59-042004 | 3/1984 | Japan | 96/4 |
| 61-146319 | 7/1986 | Japan | 95/47 |
| 62-042724 | 2/1987 | Japan | 96/4 |
| 62-110729 | 5/1987 | Japan . | |
| 63-258604 | 10/1988 | Japan | 96/14 |
| 63-270505 | 11/1988 | Japan . | |
| 64-38125 | 2/1989 | Japan . | |
| 01-038125 | 2/1989 | Japan | 96/14 |
| 64-63021 | 3/1989 | Japan . | |
| 01-063021 | 3/1989 | Japan | 96/13 |
| 01-293101 | 11/1989 | Japan | 96/10 |
| 2-21560 | 1/1990 | Japan . | |
| 02-261513 | 10/1990 | Japan | 95/45 |
| 03-012214 | 1/1991 | Japan | 95/54 |
| 03-238031 | 10/1991 | Japan | 96/13 |
| WO92/03217 | 3/1992 | PCT Int'l Appl. | 96/4 |

(List continued on next page.)

OTHER PUBLICATIONS

Salmon et al., "Chemical Modification of Conducting Polypyrrole Films", *Mol. Cryst. Liq. Cryst.* 83:265–276 (1982).

(List continued on next page.)

*Primary Examiner*—Robert Spitzer
*Attorney, Agent, or Firm*—Robbins, Berliner & Carson

[57] ABSTRACT

Dopable, fully dense polymer membranes are used to form membranes having selective permeabilities. To improve selectivity, the membranes may be subjected to chemical or electrochemical treatment with electron donors or acceptors to alter the doping level of the polymer membrane, generally in a reversible fashion. This leads to significant changes in gas permeation rates relative to what is observed for the non-doped, fully dense polymers. This change in doping level of the polymer films can be precisely controlled by varying the concentration and nature of chemical dopants used. Desirable changes in permeation rates are achieved by a treatment which comprises a reversal doping of the polymeric material, followed by removal of the dopants (to provide an "undoped" polymer). Further addition of controlled amounts of at least one dopant species to the undoped polymer by a second, "redoping" procedure can still more dramatically change the permeability of large species, leading to particularly large separation factors.

16 Claims, 2 Drawing Sheets

OTHER PUBLICATIONS

Turillon et al., "New Electrochemically Generated Organic Conducting Polymers", *J. Electroanal. Chem.*, 135:173–178 (1982).

Waltman et al., "Electrochemical Studies of Some Conducting Polythiophene Films", *J. Phys. Chem.*, 87:1459–1463 (1983).

Tourillon et al., "Morphology of Conducting Organic Polymers: Polythiophene and Poly(3-Methyl Thiophene)", *J. Poly. Sci.*, 33–39 (1984).

Krische et al., "Composites of Conducting Polymers: Polyacetylene-Polypyrrole", *Mol. Cryst. Liq. Cryst*, 121:325–329 (1985).

Wu-Song Huang et al., "Polyaniline, a Novel Conducting Polymer", *J. Chem. Soc., Faraday Trans.* 1, 82:2385–2400 (1986).

Lu et al., "Morphological Investigation of Polyaniline," *Synthetic Metals* 30:87–89 (1989).

Wan, "The Influence of Polymerization Method and Temperature on the Absorption Spectra and Morphology of Polyaniline," *Synthetic Metals* 31:51–59 (1989).

Loh et al., "Electrically Conductive Membranes: Synthesis and Applications", *Journal of Membrane Science*, vol. 50, No. 1, May 1990.

Abstract, *World Patents Index Latest*, Section Ch, Week 9010, Derwent Publications Ltd., London, GB; Class A, AN 90-069979 & JP, A,2 021 560 (Tokuyama) 24 Jan. 1990.

Abstract, *World Patents Index Latest*, Section Ch, Week 8851, Derwent Publications Ltd., London, GB; Class A, AN 88-363101 & JP, A,63 270 505 (Tokuyama Soda KK) 8 Nov. 1988.

Abstract, *World Patents Index Latest*, Section Ch, Week 8726, Derwent Publications Ltd., London, GB; Class A, AN87-181375 & JP, A,62 110 729 (Matsushita) 21 May 1987.

Abstract, *Patent Abstracts of Japan*, vol. 11, No. 326 (C-454)(2773) 23 Oct. 1987.

Abstract, *World Patents Index Latest*, Section Ch, Week 8835, Derwent Publications Ltd., London, GB; Class A, AN88-244741 & JP, A,63 175 616 (Mitsubishi Rayon) 20 Jul. 1988.

Abstract, *World Patents Index Latest*, Section Ch, Week 8912, Derwent Publications Ltd., London, GB; Class A, AN 89-038125 (KAO Corp) 8 Feb. 1989.

Anderson et al., "Conjugated Polymer Films for Gas Separations", *Science*, vol. 252, 7 Jun. 1991.

MEMBRANES HAVING SELECTIVE PERMEABILITY

This invention was made with Government support under Contract No. F4962-086-C-0060 awarded by the Air Force Office of Scientific Research and the National Science Foundation Grant No. CHE-86-57822. The Government has certain rights in the invention.

BACKGROUND OF THE INVENTION

The present invention relates to synthetic polymeric compositions. In particular, the present invention relates to the preparation of polymer membranes and the use thereof in the separation of components of gas mixtures, the separation of ions in aqueous solutions, and similar applications.

There is an ever-increasing need for improved techniques for the efficient and rapid separation of the components of mixtures. In particular, techniques for the separation of components of gaseous mixtures have many significant technical applications. Oxygen separated from the air is utilized in medical applications and enrichment of combustion processes. Nitrogen is used to protect perishables and air-sensitive materials. The removal of carbon dioxide and hydrogen sulfide from natural gas reduces pollution; the carbon dioxide may further be used for tertiary oil recovery. Methane reclaimed from landfills and mines can provide useful fuel. With improved technology, exhaust gases from internal combustion engines could be separated and recycled.

Membrane-based separation systems in theory offer enormous potential savings in energy over standard techniques (for example, cryogenic processes used for separation of gases). During the past decade, a variety of different membrane systems have been introduced commercially. These have been made possible both by the synthesis of new polymeric materials and by the development of asymmetric membranes, in which a thin skin of polymer with high selectivity is grown on a porous structural polymer support. Although some progress has been made in such membrane technology, there has heretofore been found an inverse relationship between selectivity and permeability. This has significantly limited the range of potential applications for such membranes, and has focused attention on the search for techniques to control the porosity of such membranes.

There have been a number of proposals in the prior art of methods for controlling the porosity of polymeric membranes for use in, e.g., reverse osmosis or ultrafiltration methods. For example, U.S. Pat. No. 4,452,424 to Tweddle et al. describes preparation of polysulfone cast films which are partially gelled with mineral acid prior to or during a conventional water gelation procedure. By adjusting the concentration of acid, it is alleged that the porous structure of the resulting membrane may be controlled and improved.

U.S. Pat. Nos. 4,717,393 and 4,717,394 to Hayes describe the preparation of crosslinked polyimide gas separation membranes which exhibit superior selectivity relative to uncrosslinked polyimides. The selective permeabilities observed are attributed to optimization of the molecular free volume in the polymer.

U.S. Pat. No. 4,761,233 to Linder et al. describes the casting of membranes from solutions comprising mixtures of at least one pore-forming polymer and at least one film-forming polymer. The pore-forming polymer is selected as one which if cast alone would contract to form either large pores or a non-uniform distribution of material.

While these materials have some utility with respect to separation of components of some types of mixtures, they have heretofore been inadequate for many desired separations, in particular for the separation of components of gaseous mixtures. It is known that the molecules of different gases may be differentiated on the basis of their kinetic diameters, which are calculated from measurements of the thermodynamic properties of each gas. For example, the following values for kinetic diameters (in Angstroms) have been reported: $He=2.6$; $H_2=2.89$; $Ne=2.75$; $Ar=3.40$; $O_2=3.46$; $N_2=3.64$; $CO_2=3.3$; and $CH_4=3.8$. In theory, any two gas molecules having different kinetic diameters could be separated on the basis of this difference in size.

In practice, however, achievement of this goal has been difficult at best, particularly when the difference in kinetic diameters is relatively small. Thus, there is a need for membranes with higher separation factors, i.e., ratios of the permeability of one gas to another through the membrane. For example, the best separation factors reported in the literature for mixtures comprising $O_2/N_2$ and $CO_2/CH_4$ are 16 and 60, respectively.

Through the use of known techniques, it has heretofore been possible to vary the density of polymer films over a fairly broad range. In particular., various polymers possessing pi conjugation, such as the polyaniline family of polymers, may be cast from solution or hot-pressed into fully dense films or otherwise processed into hollow fibers or asymmetric membranes.

It is also known that certain polymer systems which are electrically insulating as formed may be modified subsequent to their preparation by acid doping, or by chemical or electrochemical n- or p-doping to render the polymers electrically conductive. In this context, by dopant is meant a guest species which maintains electrical neutrality in the host polymer, while altering the pi electron density of the polymer and/or its morphology. The dopant species forms coordinate covalent and/or ionic bonds.

Thus, U.S. Pat. Nos. 4,851,487 (Yaniger et al.); 4,806,271 (Yaniger et al.), 4,798,685 (Yaniger) and 4,822,638 (Yaniger) describe application of a covalent doping agent to a base-type non-conductive polymer substrate containing carbon-nitrogen linkages to convert the substrate to an electrically conductive polymer. The products are described as useful in the preparation of electronic devices.

U.S. Pat. No. 4,615,829 to Tamura et al. describes an electroconductive organic polymer containing an electron acceptor as a dopant and consisting essentially of a linear polymer having as a main repeating unit a quinonediimine structure. According to Tamura et al., this polymer is prepared by oxidative or electro-oxidative polymerization of an aniline compound or a water-soluble salt thereof in a reaction medium containing a protonic acid. The product is a conductive polymer which exhibits stability without an additional doping step, because it allegedly has already undergone doping during the course of the oxidative polymerization. Tamura et al. suggests that the polymer may be chemically compensated with ammonia, whereby it undergoes significant loss of electroconductivity; if this polymer is then doped with an electron acceptor such as sulfuric acid, the original high electro-conductivity is restored. There is described a process wherein the polymer is produced by first reducing the electroconductive organic polymer with a reducing agent and then oxidizing and simultaneously doping the reduced polymer with an oxidizing agent which is effective as an electron acceptor; in this manner, the dopant may be replaced by a different dopant such as a halogen or Lewis acid. While no particular utility for the electroconductive polymers of Tamura et al. is disclosed, it is apparent from the specification that the salient feature of the subject materials is an electroconductivity of not less than $10^{-6}$ S/cm.

In order to provide improved separation membranes, it has been proposed to treat preformed porous or microporous membranes of non-conducting polymers with monomeric precursors of conducting polymers; the monomers are then polymerized in situ so as to plug holes in the preformed membrane (a technique generally known in the art as "healing" the preformed membrane). Membranes prepared in this manner are described in, e.g., Japanese Published Applications Showa 62-110729 (Matsushita) and Showa 63-270505 (Tokuyama Soutatsu K. K.). In addition, electrically conductive membranes have been prepared by solution coating of microporous polypropylene or polytetrafluoroethylene with the emeraldine base of polyaniline in dimethylformamide or dimethylsulfoxide soution [Loh, I-H. et al., Journal of Membrane Science 50:31 (1990)]. Central to these methods is the use of porous or microporous membranes as starting materials. Although some positive modifications in permeabilities and/or separation factors are achieved by these techniques, it is not possible to compensate entirely for the extremely high porosities of the preformed membranes and the final products are far from theoretical full density.

Japanese Published Application Heisei 2-21560 (Tokuyama Soutatsu K. K.) describes films wherein electrically conducting polymers are uniformly dispersed with non-conducting polymers. These films, however, generally have a porosity in the range of 10 to about 95%; for some applications, the porosity is as high as 98%. The exemplary products are described as having porosities in the range of 58-92%. Thus, the disclosed membranes are also quite far from theoretical full density.

Japanese Published Application Showa 64-38125 (Kao K. K.) describes gas permselective membranes composed of conjugated polymer compounds, wherein the conjugated polymer compounds are obtained by electrochemical oxidation polymerization of monomers in a solution containing supporting electrolytes. The electrolytic oxidation polymerization is performed by applying a voltage between electrodes immersed in a solution of monomers dissolved or dispersed in a polar solvent; electrolytes used in common electrolytic reactions can be used as the supporting electrolytes. Anodic doping occurs during the electrolytic oxidation polymerization, whereby the counterions of the supporting electrolytes in the electrolytic solution are captured by the polymers. The captured dopants may remain in the conjugated polymers of the invention, or the polymers may be undoped.

While the electropolymerized films prepared in this manner may have some utility for use as separation membranes, they are far from optimal for several reasons. Almost all electropolymerized films are highly porous (>90%), and therefore membranes prepared from such films would for the most part not perform adequately even after heavy doping. In view of their manner of preparation, moreover, some amount of dopant is usually buried in the polymer matrix and/or covalently bound to the polymer; this dopant cannot readily be removed from the polymer matrix. As a consequence, the electropolymerized films have a different morphology from essentially dopant-free polymer films which are, e.g., solution cast. In particular, in electropolymerized films the presence of the dopant during polymerization causes the polymer chains to pack farther apart initially than would be the case when films are prepared in the absence of dopant. This leads to a much broader (and clearly less desirable) distribution of free volume. Upon removal of some of the dopant, the ability to separate components of similar size and shape from a mixture thereof would not be improved; in fact, it has been observed that the separation factor actually decreases for, e.g., a gas pair like oxygen and nitrogen.

It is an object of the present invention to provide membranes for use in the separation of the components of various mixtures, and in particular for the separation of the components of gaseous mixtures.

It is another object of the present invention to provide method for treatment of an as-synthesized polymer to improve its utility as a membrane for use in the separation of components of various mixtures, in particular mixtures of gases.

Another object of the present invention is the selective modification of conjugated fully dense polymer membranes, such as polyaniline, for specific and selective gas separations, thereby enabling selection of one species over others in a mixture.

Another object of the present invention is to enable control of the separation of components of a mixture using a polymer membrane which may be modified by in situ treatment methods.

Still another object of the invention is to provide conjugated polymer/nonconjugated polymer or conjugated/semiconjugated fully dense polymer blends, copolymers, and polymer alloys.

Yet another object of the invention is to enable control of the average pore size of the polymer membrane.

SUMMARY OF THE INVENTION

In accordance with the present invention, membranes useful in separations of components of various types of mixtures are prepared from dopable polymers which are fully densified (e.g., by solution casting, hot-pressing into thin films, or film formation from polymer precursors). In general, such membranes comprise at least one layer of at least one dopable, fully dense polymer.

In a preferred embodiment of the invention, such dopable polymer membranes are subjected to chemical or electrochemical treatment with electron donors or acceptors to introduce a dopant into, or alter the doping level of, the polymer membrane; generally, this doping is carried out in a reversible fashion. Pursuant to the present invention, significant changes in the as-formed polymer film's morphology are observed after treatment with chemical or electrochemical dopants. This leads to significant changes in gas permeation rates relative to what is observed for the non-doped, fully dense polymers. This change in doping level of the polymer films can be precisely controlled by varying the concentration and nature of chemical dopants used.

Moreover, desirable changes in permeation rates may be achieved by a treatment which comprises a reversible doping of the polymeric material, followed by removal of the dopants (to provide an "undoped" polymer). Further addition of controlled amounts of at least one dopant species to the undoped polymer by a second, "redoping" procedure can still more dramatically change the permeability of large species, leading to particularly large separation factors.

DETAILED DESCRIPTION OF THE INVENTION

Figure 1A:
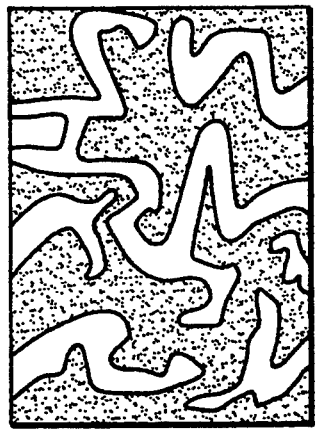
FIGS. 1(A)-1(D) are schematic representations of the as-formed inventive membranes and of the effects of doping, undoping and redoping in accordance with the present invention on pore connectivity.

Pursuant to the present invention, membranes comprising at least one layer of at least one fully dense, dopable polymer (as herein defined) are provided for use in the separation of components of various mixtures. It has been determined that such fully dense, dopable polymer compositions exhibit significant utility ab initio for the preparation of membranes which may be employed in, e.g., the separation of gases having different kinetic diameters.

Pursuant to a preferred embodiment of the invention, membranes comprising at least one fully dense, dopable polymer are treated subsequent to the formation thereof with at least one suitable dopant. In addition to inducing a transition from the insulating to the conducting regime, it has been determined that the doping process also results in modification of the transport properties of the resulting membrane. Depending on the nature of the dopant material employed for rendering the membrane conductive (for example, the acid strength, the electronegativity and the size of the resultant dopant ions) and the level of doping effected, it is possible in accordance with the present invention to selectively modify the transport properties of the membrane.

Although the present invention is broadly directed to the use of fully dense polymer membranes having selective permeability ab initio or modified permeability due to the introduction of one or more types of dopants, it has further been determined that the thus-treated polymers may be used to prepare membranes having in many instances even more desirable properties after a subsequent treatment regimen. Thus, in accordance with a further aspect of the present invention, a fully dense polymer which has been treated with at least one first dopant in a reversible manner is further modified by removal of at least a portion of the first dopant ion. Subsequent to removal of the dopant to provide a substantially undopod polymer, the resultant membrane exhibits permeabilities which in many instances differ significantly from what is observed with the polymers as formed (i.e., prior to any doping treatment).

In accordance with a particularly preferred aspect of the present invention, a substantially undopod polymer membrane (i.e., a membrane which has been treated to remove at least a portion of a first dopant) is subjected to a redoping procedure to again introduce at least one dopent. The redoping procedure may employ the same dopant as was utilized in the initial doping treatment; alternatively, a different dopant or combination of dopants may be employed to provide membranes having the desired permeability properties. It has been determined that a combined doping/undoping/redoping procedure permits the preparation of membranes having permeability properties (in particular, gas permeabilities) which are remarkably different from these exhibited by the as-prepared membranes. In particular, the resultant membranes have separation factors for the components of various gaseous mixtures which are significantly higher than any heretofore observed for polymer membranes of comparable dimensions.

Particularly suitable for use in accordance with the present invention are polymers which contain at least a partial conjugated pi system. The most important conjugated dopable polymers comprising a single type of repeating unsaturated unit are the following: polyacetylene, $(CH)_x$; polythiophene, $(C_4H_2S)_x$; polypyrrole, $(C_4H_3N)_x$; polyparaphenylene, $(C_6H_4)_x$; and polyaniline, $(C_6H_5N)_x$. These polymers may be characterized by an extended conjugated system of pi electrons. Many substituted derivatives of the monomeric materials on which the above-noted homopolymers are based, as well as mixtures of such monomer units to give copolymers or blends (polymer alloys), may also be employed to produce polymers which are amenable to treatment with one or more dopants in accordance with the present invention.

In addition to polymers having extended conjugated pi systems, it is known that certain types of polymers with nonconjugated backbones are also amenable to doping [see, e.g., Thakur, M., Makromolecules 21:661 (1988)]. For example, a polymer containing isolated double bonds with electron-donating groups attached, such as synthetic or natural rubber (cis- or transpolyisoprene) can be reversibly doped with, e.g., iodine or bromine. Thus, in the context of the present invention, by a dopable polymer is meant a polymeric composition (whether conjugated or unconjugated) which is amenable to a doping treatment with an electron donor or acceptor.

In general, all redox active conjugated polymers (including polyacetylene, polyparaphenylene, polypyrrole, polythiophene and derivatives thereof) are oxidized or reduced on p- or n-doping, respectively. Incorporation of counteranions or countercations thus serves to maintain charge balance. Polyaniline in, e.g., its emeraldine oxidation state is different, in that it is already partially oxidized; hence, the addition of acids (such as Lewis or Bronsted acids) renders the material conducting without redox chemistry.

As well as being dopable, an as-produced polymer suitable for use in accordance with the present invention is essentially fully dense. The as-formed fully dense polymer films, membranes or fibers typically possess an average pore size distribution of less than about 20 Å in diameter as determined by techniques such as the BET method ($N_2$ gas adsorption). For purposes of the present invention, a fully dense polymer generally has a density as formed of at least 90% of theoretical density; preferably, the density is greater than about 95%, and most preferably greater than about 99%, of theoretical density. For example, a typical film suitable for use in accordance with the present invention had a measured true density of 1.257 g/cm$^3$ by helium pycnometry (whereby density is measured without counting pores filled by helium); when the density was determined by weighing a 2 cm$^2$ piece of film and measuring its thickness, the density (including void spaces) was determined to be 1.244 g/cm$^3$. Thus, the percent of experimental density was 99%. In order to separate gases other than on the basis of their mass, the layer of at least one dopable fully dense polymer must of course be pinhole-free, as that term is generally understood by those skilled in the art.

Although they are amenable to doping, many of the above-noted conjugated polymers are porous in film form to all gases. As a consequence, such polymers would be of limited use as the basis for preparation of membrane separators. For example, certain electrochemically synthesized films such as polyparaphenylene and polypyrrole films have been found to be unsuitably porous. Of the chemically synthesized films, polyacetylene synthesized using a Ziegler-Natta catalyst [Ti(OBu)$_4$ and Al(Et)$_3$] is porous; the coherent films are only ⅓ full density. Of the derivatized films, poly-3-octylthiophene is porous. Of the copolymers, polythiophene vinylene has been found to be porous.

On the other hand, other monomers and monomer mixtures may be employed to prepare fully dense polymers. Such fully dense materials in general have some gas separating abilities ab initio; it is this ability which is exploited in accordance with the present invention, and effectively enhanced in accordance with preferred embodiments of the present invention. Examples of polymers which can be made fully dense include: polyaniline; polyacetylene made by the Durham method [see, e.g., Feast, W. J. and Winter, J. N., J. Chem. Sot., Chem. Commun., 1985, p. 202; EP-A-0 173 473] or the Grubbs method-ring opening metathesis polymerization (ROMP) of cyclooctatetraene [Ginsburg, E. J. et al., J. Am. Chem. Soc. 111:7621 (1989)]; polythiophene; and polypyrrole. In principle, any fully dense polymer having an extended and/or partial conjugated pi electron system so as to be amenable to a doping treatment is contemplated as suitable for use in the preparation of the novel products in accordance with the present invention.

While not wishing to be bound to any particular theory, it is believed that the substantial increase in separation factors achieved in accordance with the present invention is due to the effects of the introduction, removal and/or reintroduction of dopant ions on the interconnected porosity of the polymer. In particular, introduction of a dopant is believed to modify the network of interconnected pores in the polymer in an essentially irreversible manner. Upon removal of the dopant species, the membrane exhibits a novel porous structure unlike that of the as-formed membrane. Further treatment with one or more suitable dopants permits additional selective modification of the membrane structure, leading in many instances to membranes exhibiting heretofore unattainable selectivities with respect to molecular size (for example, the kinetic diameter of gas molecules).

A schematic representation of the speculated effects of doping on pore connectivity is shown in FIG. 1, which illustrates a cross-section of polymer membrane. The polymer is illustrated in FIG. 1(A) in its as-cast form with no dopant addition. FIG. 1(B) illustrates the polymer as heavily doped. FIG. 1(C) illustrates the polymer in undoped form (i.e., after removal of the dopant from the system depicted in FIG. 1(B). Finally, FIG. 1(D) illustrates the polymer of FIG. 1(C) after it has been partially redoped.

Figure 1B:
Figure 1C:
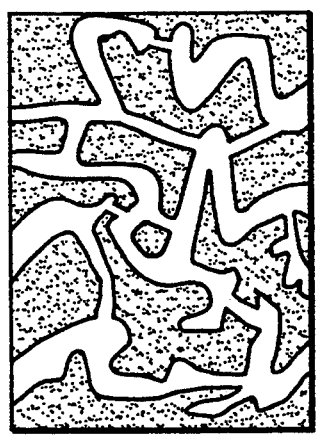
Figure 1D:

The as-cast, fully dense film of FIG. 1(A) typically has some permeability to gases. This permeability is size dependent; as a result, the as-formed film exhibits modest separation ratios for gases having different kinetic diameters. This suggests that there is a limited amount of interconnected porosity in the polymer as formed, whereby the film is permeable to some (generally, low diameter) molecules. Doping the film as illustrated in FIG. 1(B) reduces the permeability of all molecules; in addition, it is suspected that some dopant species may occupy locations in the polymer in between non-interconnected pores, as may be seen by comparison of FIG. 1(A) with FIG. 1(B). As illustrated in FIG. 1(C), undoping the film is believed to result in a greater degree of interconnected porosity, although the relative dimensions of the newly-introduced channels may be substantially smaller than those found in the as-formed material; this leads to an increase in the permeability of small molecules relative to the as-cast film. Finally, as shown in FIG. 1(D), partial redoping blocks the permeability of the film to larger molecules (e.g., by closing or partially closing the larger channels of interconnected porosity). This leads to very high separation ratios.

With regard to the exemplary polyaniline films, it is believed that the most important criteria for preparation of optimal membranes are selection of the dopant species (i.e., choosing a proper sized dopant species with the appropriate acid strength and/or redox potential) and control of the doping/redoping process (i.e., employing the appropriate concentration of dopant). For example, precise control of the film's morphology can be achieved by adjusting one or more of the following: the molarity of the acids employed; the concentration of the redox doping agents; or the number of coulombs passed during electrochemical doping, especially as a function of time. Other parameters, however, may also be varied to modify the properties of the resultant film. These include: cure time for film formation; use of derivatives of polyaniline (such as 2-ethyl polyaniline) [Leclerc, M. et al., Macromolecules 22:649 (1989)]; the molecular weight of the polymer; and electrochemical doping or electrochemical-assisted doping. It is further possible to change the oxidation state of the polymer; thus, while use of the emeraldine form (the 50% reduced form) is exemplified, the fully reduced leucoemeraldine, 75% reduced protoemeraldine, 25% reduced nigranaline and 0% reduced or fully oxidized pernigraniline could also be used.

The range of alternative formulations useful in accordance with the present invention may be expanded by the use of various copolymers. Thus, for example, copolymers of aniline and thiophene have been prepared and characterized [Polis, D. W. et al., Macromolecules 23:3231 (1990)]. In addition, blends of various polymers may be employed, such as blends of polyaniline and other conjugated polymers including polyaniline derivatives, or blends with nonconjugated polymers such as polyimides or Kevlar. For example, various blends of conducting polymers in insulating host polymers have been described [see, e.g., Wang, H. S. et al., Macromolecules 23:1053 (1990)].

Further, the polymeric material may be employed in a variety of product shapes and forms. Typically, fully dense polymer films are formed by solution casting from soluble monomers or precursor polymers, or by forming a polymer gel which is then hot-pressed. The fully dense free-standing films prepared in this manner typically have thicknesses ranging from about 1000 Å ($10^{-4}$ mm) to about 1 mm; in the following experiments, for example, films with a thickness on the order of about 0.1 mm were employed. Other formulations of the final product may, however, be more suitable for particular uses. For example, polyaniline may be spun into hollow fibers or formed into asymmetric membranes, which have important applications in current gas separation technologies. In particular, the use of asymmetric composites wherein the novel modified polymer is used to form a thin skin on the surface of a porous substrate further enhances the throughput of gas without sacrificing the selectivity of the separation. Asymmetric membranes can be made by utilizing a non-solvent during the curing process, for example, adding methanol to polyaniline in N-methyl pyrrolidinone during film formation. Asymmetric composites may be easily made from a solution of the polymer by dipping or spraying a suitable substrate of either flat or tubular configuration. Thus, for example, spin coating or spraying may be used to produce polymer skins having a thickness in the range of about 100 Å to about 100,000 Å; typically, asymmetric membranes are formed by coating a thin dense film (on the order of, e.g., about 1000 Å) onto a porous support. The possibility of forming similar composites with other fully dense, dopable polymers further expands the range of applications for the compositions of the instant invention.

A variety of techniques are available for utilization of the membranes of the invention. In general, separation of one component from a mixture comprising that component entails bringing the feed mixture into contact with one side of the membrane and recovering a portion of the mixture which is enriched in the desired component (the permeate) at a second, opposite side. The remainder of the feed mixture (the raffinate) may be separately recovered and/or subjected to a further treatment. The behavior of systems is dependent upon a number of factors, including varying composition, pressure, upstream to downstream pressure ratio and stage-cut. The stage-cut is the fraction of the incoming feed stream that passes through the membrane as permeate. Higher membrane selectivities as are achieved in accordance with the instant invention minimize the stage-cut by limiting the amount of the undesired component that passes through the membrane. For example, for nitrogen enrichment of air, where the residue is the desired stream, this means that lower compression costs are incurred to produce a given quantity of product gas at the required purity. For hydrogen separations, where the permeate is the most valuable stream, higher selectivities allow higher fractional recoveries of valuable product, without falling below the product purity specification.

A useful membrane process requires the development of a membrane module containing large surface areas of membranes. The earliest designs (plate-and-frame modules) were based upon simple filtration technology and comprise flat sheets of membrane held in a conventional type of filter press. In typical systems, membrane feed spacers and product spacers are layered together between two end plates.

Spiral-wound modules have been developed in a number of different formats. In one simple design, a membrane envelope is wound around a perforated central collection tube. The wound module is placed inside a tubular pressure vessel and feed gas is circulated axially down the module across the membrane envelope. A portion of the feed permeates into the membrane envelope, where it spirals towards the center and exits via a collection tube. Commercial spiral-wound modules have typically been about 36–40 inches long with diameters of 4, 6, 8 or 12 inches. These modules typically have a number of membrane envelopes, each with an area of approximately 20 ft$^3$, wrapped around the central collection pipe. Multileaf designs are used to minimize the pressure drop encountered by the permeate gas traveling towards the central pipe; if a simple membrane envelope were used, this would amount to a permeate spacer length of 5–25 meters, producing a very large pressure drop (especially with high flux membranes).

In a preferred embodiment of the present invention, the membranes are prepared in the form of thin tubes or fibers. Formation of membranes into hollow fibers has a number of advantages. Although hollow-fiber membranes generally have lower fluxes compared to flat-sheet membranes prepared from the same materials, it is possible to form compact modules with very high surface areas using the hollow fibers. The hollow fibers are usually on the order of 25–200 $\mu$m in diameter, and may be made with a homogeneous dense structure or preferably as a microporous structure having a dense permselective layer on the inside or outside surface. When the hollow fiber is formed entirely of a fully dense conductive polymer, the dense surface layer may be integral; in an alternative embodiment, at least one fully dense conductive polymer layer may be coated onto a fiber support. The fibers are packed into bundles and potted into tubes to form a membrane module. More than a kilometer of fibers is required to form a membrane module with a surface area of one square meter. Hollow fibers may in general be fabricated by solution spinning (in which a polymer solution is extruded and precipitated into a bath of nonsolvent) and melt spinning (in which a hot polymer melt is extruded from an appropriate die and then cooled and solidified in air or a quench tank). Both methods are well known in the art and may be adapted to produce membranes for use in accordance with the present invention.

Hollow fiber modules have typically been formed in three basic geometries. The first is an open-end tubular module, in which typically the feed is introduced into one end of a plurality of hollow fibers contained within a tube, and the permeate escapes from the hollow fibers into the tube. The raffinate is recovered at the other end of the fibers. The second is a closed-end design, in which a loop of fiber or a closed bundle is contained in a pressure vessel. The system is pressurized from the shell side and permeate passes through the fiber wall and exits via the open fiber ends. This design is easy to make and allows very large fiber membrane areas to be contained in an economical system. Because the fiber wall must support a considerable hydrostatic pressure, these fibers usually have a small diameter, on the order of 100 $\mu$m inner diameter (ID) and 150–200 $\mu$m outer diameter (OD). The third type of hollow-fiber module is the flow-through system; the fibers in this type of unit are open at both ends, and the feed flow is circulated on the inside or the outside of the fibers. To minimize pressure drops in the inside of the fibers, the fibers often have larger diameters than the very fine fibers used in closed-loop systems. These so-called spaghetti fibers are typically used in ultrafiltration, pervaporation and low- to medium-pressure gas applications (with the feed being circulated through the lumen of the fibers). Feed pressures are usually limited to less than 150 psig in this type of application.

The choice of an appropriate module design for a particular membrane separation is a balance of a number of factors, which would readily be appreciated by those of skill in the art. In addition to cost, one major factor is resistance to fouling. Membrane fouling is particularly important in liquid separations, such as reverse osmosis and ultrafiltration; in gas separation applications, fouling is more easily controlled. Open-end tubular systems have a very good resistance to fouling, and both capillary fiber systems and plate-and-frame systems have a good resistance to fouling; the resistance to fouling of spiral-wound systems is only moderate, and closed-end hollow fiber systems in general exhibit very poor resistance. Other factors often considered are the suitability of module design for high pressure operation and the relative magnitude of pressure drops on the feed and permeate sides of the membranes. The closed-end hollow fiber modules and the spiral-wound modules are both very suitable for high-pressure operations; whereas the occurrence of parasitic pressure drops in spiral-wound systems is only moderate, they occur with more frequency in the closed-end systems. On the other hand, capillary fiber systems are generally unsuitable for high pressure operation, and such operation can be done with difficulty using plate-and-frame or tubular modules.

In reverse osmosis, most modules are of the hollow fine fiber or spiral-wound design. Plate-and-frame and tubular modules are used in a few applications where membrane fouling is particularly severe (e.g., food application or processing of heavily-contaminated industrial wastewater). In ultrafiltration applications, tubular or plate-and-frame systems are used if the feed solution is extremely fouling. Spiral modules, particularly newer designs with increased resistance to fouling, are receiving increasing application; in addition, capillary systems are also used in some ultrafiltration applications. In high pressure gas separation applications, hollow fine fibers are most generally employed, although some spiral-wound module systems are also in current use. On the other hand, for low pressure or vacuum gas separations (for example, the production of oxygen-enriched air or the separation of organic vapors from air), spiral-wound modules are much more commonly used; in these applications, the feed gas is at close to ambient pressure and a vacuum is drawn on the permeate side of the membrane. Parasitic pressure drops on the permeate side of the membrane typically preclude the use of hollow fine fiber designs in these applications. Finally, pervaporation has the same type of operational constraints as low pressure gas separation; pressure drops on the permeate side of the membrane must be small. Accordingly, spiral-wound modules and plate-and-frame systems are most commonly used; in particular, plate-and-frame systems are competitive in this application despite relatively high cost, because they can typically be operated at high temperatures with relatively aggressive feed solutions (where spiral-wound systems might fail).

Membrane-based gas separation systems have always promised greater energy efficiency than cryogenic-based separations. In actual practice, however, membranes have heretofore been limited to small- to medium-size applications (generally, <100 standard $ft^3$/hr at 95% purity). This limitation comes as a result of the fundamental inverse relationship between separating ability and flowrate. As the flowrate of the gas product through the membrane is increased, the separating ability decreases. In order to escape this paradox, one can look to new membrane compositions (for example, the membranes of the present invention) and/or change the physical parameters of the membrane. In particular, several approaches are especially useful in preparing membranes in accordance with the present invention. One approach is to make a membrane with a very thin separation layer (i.e., an asymmetric film); as discussed herein, in one preferred embodiment this thin separation layer comprises at least one fully dense conducting polymer. Another approach is to increase the surface area of the membrane by making small tube membranes (i.e., hollow fibers); in a preferred embodiment, the hollow fibers comprise a layer of at least one fully dense conducting polymer as the separation layer.

Gas separation membrane processes suffer depletion of the driving force (i.e., the partial pressure difference along the unit). Except with highly permselective membranes, it is difficult to produce high-purity permeate unless the partial pressure of the faster permeating gas in the feed stream is maintained at a relatively high level. Single-stage permeation is a single pass of the feed mixture through the separation module. By linking several modules in series, a membrane with a small separation factor can be successfully used in a commercial process. For example, for the recovery of helium from natural gas, where the initial concentration of helium is <1%, a single-stage unit would generally not be sufficient. Moreover, production of a high-purity permeate and high-purity residue is required simultaneously. Although systems requiring multiple compression operations have been unattractive because of high capital and operating costs, two and three stage systems may be successfully employed using the highly selective membranes provided in accordance with the present invention.

The plate-and-frame method approach gives the lowest surface area/unit-volume ratio. Available modules (for example, from GKSS of Germany) can achieve as much as 200 $ft^2$ of membranes per $ft^3$ of module with an efficient arrangement of a central collection tube, support frames and permeate channels. The hollow-fiber and spiral-wound module configurations can achieve substantially higher area densities. For example, a 15-fold increase in permeation area per unit volume (i.e., to about 3000 $ft^2$ of membrane per $ft^3$) can be achieved with 200-$\mu$m outside diameter fibers packed at a 50% void factor in a 10-inch diameter shell. Even higher area densities may be achieved by using smaller diameter fibers and higher packing densities, the limiting factor usually being the pressure drop in the fibers and shell. The spiral-wound configuration provides area densities intermediate between the plate-and-frame and typical hollow fiber modules, with 1000 $ft^2$ of membrane per $ft^3$ of module being typical; this can be increased somewhat by optimization.

Based upon a need to maximize production rates, hollow-fiber modules are expected eventually to dominate the gas separation field. In high pressure gas separation applications (such as hydrogen and carbon dioxide separations), the pressurized feed gas is usually introduced on the shell side of the hollow fiber. Fibers are much stronger under compression than under expansion, and if individual fibers fail they do so by being crushed closed. This means they no longer contribute to the total membrane area, but they do not serve as bypasses to contaminate the permeate with feed gas. The flows in such modules have aspects of both countercurrent and cross flow patterns. For low-pressure applications where fiber failures are less likely, for example the production of nitrogen from air, bore-side feed is common, even if the skin layer is on the outer fiber surface.

An advantage of this configuration is that channeling and other flow distribution problems are eliminated. Approximate crossflow or countercurrent flow patterns can be achieved with bore feed by using a central collection tube (cross flow) or by removing product from the shell at the same end as the feed entered (countercurrent). Pursuant to a particular embodiment of the invention, the permeability of the inventive membranes may be modified in situ by blending in small amounts of a gaseous dopant with the permeant. In this manner, the properties of the membrane may be further optimized during the actual separation process. As an example, a gas separating system optimized originally for separations at 25° C. could be reoptimized for use at 40° C. without removing the separation system from service.

Morphological changes that result in improved gas selectivities may be produced in conjugated base-type polymers (such as polyaniline) by exposure to either Bronsted or Lewis acids. The former induce protonic acid doping of the nitrogen atoms along the polymer backbone to form covalent N—H bonds. The most generalized formula for the Bronsted acids is H—X. X dissociates to form one of two species: an inorganic anion $X^-$, such as fluoride ($F^-$), chloride ($Cl^-$), bromide ($Br^-$), iodide ($I^-$), bisulfate ($HSO_3^-$), nitrate ($NO_3^-$), perchlorate ($ClO_4^-$), etc.; or an organic anion $X^-$, such as brosylate ($BrC_6H_4SO_3^-$), tosylate ($CH_3C_6H_4SO_3^-$), acetate ($CH_3CO_2^-$), formate ($HCO_2^-$), etc. Selection of a suitable Bronsted acid on the basis of, e.g., the size of the anion desired for a given system would be well within the skill of those working in the field.

Similar changes can be effected in the polymer films by reaction with acids that accept electron density (Lewis acids) from, e.g., the lone pair of the polyaniline nitrogen to form carbon-nitrogen, silicon-nitrogen, sulfur-nitrogen, oxygen-nitrogen, phosphorus-nitrogen, etc., coordinate covalent bonds during the doping process. These Lewis acid compounds may be represented as $RX$, $R_3OX$, $R_2SO_4$, $R'SO_2Cl$, etc., wherein R or R' is alkyl or alkenyl (for example, of 1 to 20 carbon atoms), or is aryl or aralkyl (e.g., tosyl, benzyl, tolyl, xylyl or other aromatic groups). X represents anionic species such as chloride ($Cl^-$), fluoride ($F^-$), iodide ($I^-$), bromide ($Br^-$), hexafluorophosphate ($PF_6^-$), hexafluoroarsenate ($AsF_6^-$), benzene sulfonate ($C_6H_4SO_2^-$), etc. Similarly, sulfonic anhydrides (R—$SO_2$—O—$SO_2$—R') or carbonyl anhydrides (R—CO—O—CO—R') may be used as alkyl Lewis acids; in these formulas, R and R' may be the same (e.g., as in tosylic anhydride or 5-norbornene-2,3-dicarboxylic anhydride) or different.

Exemplary Lewis acids which may be employed in accordance with the present invention include the following: benzene sulfonyl chloride, p-toluene sulfonyl chloride, p-toluene sulfonic anhydride, trimethyl silyl chloride, benzyl bromide, 4-bromo-1-butene, chlorophenyl methyl ketone, 1,4-dichlorothionyl-benzene, dimethyl sulfate, methyl sulfate, methyl iodide, trimethyl oxonium tetrafluoroborate, p-toluenesulfonyltriflate, aluminum trichloride ($AlCl_3$), boron trichloride ($BCl_3$), copper chloride ($CuCl_2$), tungsten hexacarbonyl ($W(CO)_6$), etc. As this representative list illustrates, there is available an extremely broad range of suitable Lewis acids which may be employed in accordance with the inventive method. The selection of suitable dopant materials by those working in the field would be routine, as virtually any desired anion or cation may be provided in the form of a Lewis or Bronsted acid.

The dopants are selected based on size, acid strength, redox potential, etc. This enables modification of the porosity of the polymer film for the desired gas separation. As is well known to those of ordinary skill in the art, a wide range of inorganic and organic ions may suitably be used as dopants for particular polymer compositions. The dopants are reacted with the polymer within the gas or liquid phase and/or by electrochemical methods in a manner known per se.

Typically, a dopant is introduced at a level within the range of about 0.001 mol % to about 50 mol % per repeating (dopable) unit in the polymer; preferably, the dopant is present at a level in the range of about 10 mol % to about 50 mol %, and more preferably at a level greater than about 25 mol % per repeating unit. Most preferably, the dopant level is close to 50 mol % to maximize gas permeabilities upon a subsequent undoping. Thus, for example, a preferred value for initial doping of polyaniline in its emeraldine oxidation state is 50 mol %; this corresponds to 1 dopant for every 2 monomeric units, and reflects the fact that only every other nitrogen in the polymeric system can be oxidized.

With reference in particular to the exemplary freestanding fully dense polyaniline films described herein, the initial doping may be carried out in concentrated (e.g., 4M) acid for a suitable period of time (e.g., about 6 hours); this results in the formation of a product having about a 50 mol % dopant concentration. The dopant concentration of the resultant product may be determined by a variety of techniques, including elemental analyses, gravimetry (i.e., weight uptake), counting coulombs during electrochemical doping, and using concentration vs. pH curves at equilibrium [see, e.g., Chiang, J. -C. and Macdiarmid, A. G., Synthetic Metals 13:193 (1986)].

Dopant removal (to prepare a substantially "undoped" polymer) may suitably be effected using, e.g., an aqueous base solution (for example, 1M $NH_4OH$) to remove substantially all of the dopant. Typically, as determined by the previously discussed methods, the undoped polymer after treatment with base has a residual dopant concentration of less than about 0.01 mol %. As a result of the inventive doping/undoping treatment, however, the permeability properties of the polymer are substantially different from, e.g., a polymer which has simply been doped to a comparable level.

The redoping concentration is suitably within the range of about 0.1 mol % to about 50 mol %, preferably within the range of about 1 mol % to about 40 mol %, and most preferably on the order of about 25 mol %. It has been determined that such redoping concentrations are effective for lowering the permeabilities of larger gases. These dopant concentrations are achieved using, e.g., 0.001M–1M acid solutions (with solutions on the order of about 0.02M being preferred).

While the separation of the components of gaseous mixtures is discussed in greater detail herein, the membranes Of the present invention also clearly have utility in connection with a variety of other types of separations, such as the separation of ions in solution (i.e., separations in the condensed phase). Thus, for example, an electrochemical separation cell may be prepared using a membrane in accordance with the present invention to divide a permeant electrolyte from a feed electrolyte. An electric field is used to drive smaller ions (e.g., $Na^+$ or $K^+$) to the permeant side, while larger ions (e.g., $Cs^+$, $Am^{3+}$ or $Pu^{4+}$) unable to pass through the membrane would be retained on the feed side. The ability to employ a membrane in accordance with the present invention to separate ions in solution on the basis of size also has numerous applications well known to those of skill in the art. A particularly valuable application of such a membrane is in the processing of low and medium level nuclear waste, as generally discussed in Cecille, L. and Toussaint, J. C., *Future Industrial Prospects of Membrane Processes*, Elseview Science, New York, N.Y. (1989), the entire disclosure of which is hereby incorporated by reference.

The invention will be better understood by reference to the following examples which are intended for purposes of illustration and are not to be construed as in any way limiting the scope of the present invention, which is defined in the claims appended hereto.

EXAMPLE 1

Synthesis of Polyaniline Free-Base Films in the Emeraldine Oxidation State

Aniline is distilled from barium oxide in vacuo. To 1200 mL of a 1M HCl solution is added 80 mL of aniline (859 mmol) in a 3 L resin kettle. The aniline hydrochloride is chilled to $-3.5°$ C. 46.4 g (216 mmol) of ammonium peroxydisulfate is dissolved in 800 mL of 1M HCl and cooled to 0° C. The oxidant solution is added dropwise to the resin kettle containing the aniline in a dropwise fashion for 45 minutes by means of an addition funnel. The reaction is allowed to proceed for 1.5 hours with continuous stirring at constant temperature. A blue-black precipitate with a coppery reflective tint is observed after the first few minutes of the reaction.

The resulting polymer is filtered on a Buchner funnel and washed with 12 L of 1M HCl and 12 L of deionized water (or until the washing solution is colorless). Care must be taken that the water washing level does not fall below the level of the precipitate on the Buchner funnel until the mother liquor is colorless. The moist cake of emeraldine hydrochloride is then dried and ground in a mortar and pestle.

A 5.0 g batch of polyaniline hydrochloride, in the emeraldine oxidation state, was synthesized following the procedures described above. Following deprotonation of the emeraldine hydrochloride with 4 L of 0.1M $NH_4OH$, the polymer was dried under dynamic vacuum. It was then manually ground to a very fine powder in an agate mortar and pestle and transferred to an evaporating dish. The mass of polymer was then treated with tetrahydrofuran (THF) by adding the solvent dropwise until the surface of the mass appeared wet. The solvent was allowed to evaporate in the fume hood. The dry powder was subsequently reground in a mortar and pestle, then added to 4 L of 1M HCl and stirred for one hour. The resulting emeraldine hydrochloride was collected on a Buchner funnel, dried under vacuum, and reground in a mortar and pestle. It was then treated through 3 more identical base-THF-acid cycles as described above to give a soluble emeraldine base powder used in film formation. The whole batch was then dried under dynamic vacuum for 24 hours at room temperature and stored in a desiccator for further use.

Exactly 5.02 g of this emeraldine base powder was added to an evaporating dish. Approximately 30 mL of THF was added dropwise to the surface of the polymer powder by means of a pipet. After the mixture had swollen with ether, it was allowed to dry in the fume hood. 20 ml of N-methyl-pyrrolidinone (NMP) was added to a mortar. Small increments of emeraldine base were mixed into this solvent and ground with a pestle until a homogeneous viscous solution was obtained. Another 20 mL of NMP was added to the mixture with continuous grinding. The remaining mass of emeraldine base was incrementally added and the solution was ground in the mortar and pestle for 45 minutes. During this period another 10 mL of NMP was added to give a final volume of 50 mL.

At the end of that time the very viscous solution of polyaniline base was processed into thin films by pouring the solution into glass petri dishes and curing them at 125° C. for 3 hours. This homogeneous solution of dissolved polymer was also suitable for film casting with a spreader bar on glass plates and cured at the same temperature.

The cast film plates or petri dishes were immersed in a plastic developing tank that contained deionized water. This procedure facilitated removal of the extremely adhesive as-cast films. The resulting films exhibited excellent mechanical properties, were environmentally stable, and are robust enough to withstand at least a pressure differential of 150 psi.

EXAMPLE 2

Use of Modified Polyaniline Films in Separation of Gases

Various membranes were prepared in accordance with the method of Example 1 and evaluated with respect to their utility in separating the components of gaseous mixtures. In general, the permeability of the various gases was measured in each instance for the as-formed film and compared to the values measured after chemical or electrochemical doping.

Emeraldine films were doped with 4M halogenic acid solutions, each for 6 hours. Following washes of the treated films with deionized water, the samples were dried under dynamic vacuum for 12 hours, and then evaluated for gas permeabilities.

The samples were then placed into a solution of 1M aqueous ammonium hydroxide for 10 hours. Following washes with deionized water, the films were dried under dynamic vacuum for 12 hours. The samples were then reevaluated for gas permeabilities.

Further improvements in the separation ability of the doped/undoped films were achieved by allowing the films to equilibrate for 6 hours in dilute solutions of HCl at concentrations in the range of 0.005 to 0.020M. In this manner, at least a partial redoping of the modified polymer films was achieved.

The electrochemically assisted doping process employs a Ag/AgCl reference electrode used as a cathode, with the polymer film as the anode of an electrochemical cell. 4M HCl was employed as both the dopant and the electrolyte solution. As a typical example, a 3 $cm^2$ sample of film was doped at +17.38 V versus the reference electrode for 2.5 hours, allowing 1.20 coulombs of charge to pass. The electrochemically-assisted film was then further processed in the same manner as the chemically doped films.

Figure 2:
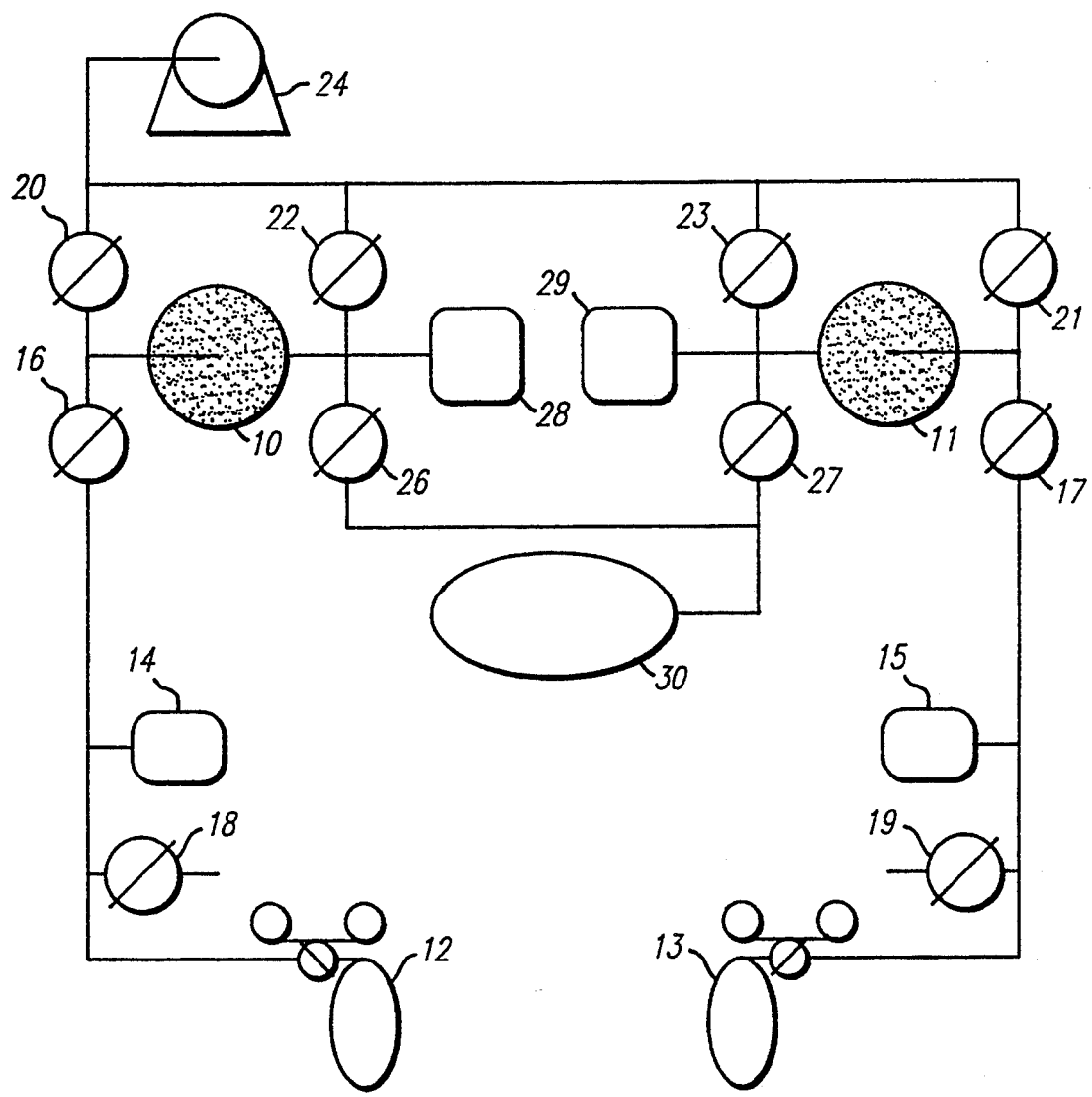
FIG. 2 illustrates a system for use in evaluating the permeability of a membrane to components of a gaseous mixture.

A system designed and built for pure gas permeability measurements utilizing the manometric method (i.e., constant permeation volume) to measure the gas flux through the polymer film is illustrated in FIG. 2. Further details concerning the construction and operation of such systems may be found in, e.g., ASTM Designation 01434-82, "Determining Gas Permeability Characteristics of Plastic Film and Sheeting," Annual Book of ASTM Standards (1982) and O'Brien, K. C. et al., J. Memb. Sci. 29:229 (1986), the entire disclosures of which are hereby incorporated by reference.

As illustrated in FIG. 2, the test system comprises a pair of cells 10 and 11. Individual gas supplies 12 and 13 are provided for each cell, as are associated gas feed transducers 14 and 15. Interposed between the respective gas supplies and the cells are gas feed valves 16 and 17. In addition, individual gas purge valves 18 and 19 are associated with cells 10 and 11, respectively.

Upstream valves 20 and 21 and downstream valves 22 and 23, respectively, permit the opening and closing of appropriate lines for evacuation of the cells using associated evacuation means 24. Each cell is further provided with respective sample injection valves 26 and 27. Permeant transducers 28 and 29 are also provided for each cell.

Using cell A to illustrate the operation of the system, the membrane sample is initially degassed by opening valves 20 and 22 to the high vacuum source (i.e., evacuation means 24). The valves are then closed and a series of reference measurements (leak rate determinations) are made by recording the pressure rise with time using the permeant transducer 28. This data is analyzed by the computer and the test continued if the data is acceptable. Valves 20 and 22 are opened again to evacuate the sample and valve 18 is opened to purge out the gas feed line from gas supply 12. All three valves are then closed and valve 16 is opened to admit the test gas at a fixed pressure (e.g., 40 psi) to the upstream side of the membrane. As the test progresses, the permeant gas accumulates in the downstream volume between the membrane, the permeant transducer and valves 22 and 26. The pressure versus time data is again analyzed by the computer; if the data is within the preset accuracy (e.g., 5% relative standard deviation), the test is automatically stopped. Valve 16 is closed and valves 20 and 22 opened to prepare the membrane for the next test. The volumes of the test cells on the downstream side of the membrane were calibrated by gas expansions from a cylinder 30 of known volume using valves 26 and 27 prior to membrane testing. The permeability values are calculated by the computer from the downstream volume, the reference and permeation data, the film thickness and gas feed pressure obtained from gas feed transducers 14 and 15.

In the exemplary system described, the gas feed transducers were a strain gauge type made by Omega Engineering, Stamford, Conn. The permeant transducers were high accuracy capacitance manometers made by MKS Instruments, Andover, Mass. All valves used in the system were air-operated bellows-seal valves, as are available from, e.g., Nupro, Willoughby, Ohio. All vacuum tubing in the system was ¼" or ½" o.d. 304 stainless steel; the gas feed lines were ⅛" copper tubing. The entire apparatus was housed in a small oven with a thermostatic regulator set to maintain a 25° C. environment. The complete operation of the system is suitably controlled by a personal computer (e.g., a Gateway 2000, available from Gateway, Sergeant Bluff, Iowa) with standard data acquisition and control boards (e.g., as available from Omega Engineering) including statistical analysis and reduction of raw data to permeability. The separation ratios were calculated directly from the permeability measurements.

Table 1 shows that fully dense polyaniline films have different permeabilities for different gases. Thus, such as-formed fully dense films have a baseline ability to separate a small gas such as helium (He) from a large gas such as nitrogen ($N_2$). Throughout, permeability is expressed in terms of barrers: 1 barrer=$10^{-10}$ $cm^3$(STP)/cm sec(cm Hg). Doping the film appears to fill some of its pores and decreases the permeabilities of all gases; this doping treatment especially diminishes the permeability of the larger gases, leading to higher He/$N_2$ separation ratios. Undoping the polymer increases the permeability of all gases but especially enhances the throughput of small gases, such as He, leading to even higher He/$N_2$ separation ratios.

TABLE 1

| Polyaniline Membranes Permeabilities (in Barrers) | | | |
|---|---|---|---|
| Gas | As-cast Film | 4M HCl Doped | Undoped |
| He | 4.90 | 2.06 | 11.5 |
| $N_2$ | 0.0382 | <0.005 | 0.00323 |
| He/$N_2$ Separation Factors | | | |
| As Cast | 4M HCl Doped | | Undoped |
| 128.3 | >412 | | 3560.4 |

Table 2 also demonstrates that the polyaniline membranes as-cast have different permeabilities with different gases. It further shows that the doping/undoping process can be used to greatly enhance the separation ratio for the important gas pairs $H_2/N_2$, $O_2/N_2$ and $CO_2/CH_4$.

TABLE 2

| | Permeabilities (Barrers) | |
|---|---|---|
| Gas | As-Cast Film | Doped/Undoped |
| He | 3.89 | 11.2 |
| $H_2$ | 3.08 | 11.6 |
| $CH_4$ | 0.0233 | 0.00387 |
| $CO_2$ | 0.421 | 1.30 |
| Ar | 0.0612 | 0.0143 |
| $O_2$ | 0.141 | 0.200 |
| $N_2$ | 0.0149 | 0.00154 |
| | Separation Factors | |
| Gases | As-Cast Film | Doped/Undoped |
| $H_2/N_2$ | 206.7 | 7532.5 |
| $O_2/N_2$ | 9.5 | 129.9 |
| $CO_2/CH_4$ | 18.1 | 335.9 |

Table 3 uses another piece of the same film as was employed in the separations reported in Table 2; however, here an electrochemically assisted process was used while doping in 4M HCl acid solution. As can be seen, this electrochemically-assisted process does not improve the separation factors after undoping in 1M $NH_4OH$, as compared to chemical doping.

Table 3 also illustrates the effects of redoping with a low concentration of acid. A 0.01M solution of HCl partially blocks up a few pores, thereby cutting down the permeability of the larger gases, while only slightly decreasing the permeability of the smaller gases. This leads to significant increases in separation factors. A redoping with 0.02M HCl has an even more dramatic effect on cutting off the passage of large gases, leading to very good separation ratios.

TABLE 3

| Polyaniline Membranes Permeabilities (Barrers) | | | |
|---|---|---|---|
| | | Doped/Undoped | Chemically |
| Gas | As-Cast Film | Electrochemically Assisted | Redoped 0.01M | Redoped 0.02M |
| He | 3.89 | 15.4 | 10.6 | 8.15 |
| $H_2$ | 3.08 | 16.6 | 10.2 | 7.18 |

TABLE 3-continued

| | | | | |
|---|---|---|---|---|
| $CH_4$ | 0.0233 | 0.928 | 0.0228 | <0.002 |
| $CO_2$ | 0.421 | 2.29 | 0.0749 | 0.0613 |
| Ar | 0.0612 | 0.337 | 0.0190 | 0.0598 |
| $O_2$ | 0.141 | 0.550 | 0.135 | 0.0598 |
| $N_2$ | 0.0149 | 0.407 | 0.0161 | <0.002 |

| | Separation Factor | | | |
|---|---|---|---|---|
| Gases | As-Cast | Doped/Undoped Electrochemically | Redoped 0.01M | Redoped 0.02M |
| $H_2/N_2$ | 206.7 | 40.8 | 633.5 | >3590 |
| $O_2/N_2$ | 9.5 | 1.4 | 8.4 | >29.9 |
| $CO_2/CH_4$ | 18.1 | 2.5 | 3.3 | >30.7 |

Table 4 further illustrates the effects of doping/undoping and redoping. Here the baseline $H_2/N_2$ separation factor is enhanced by doping/undoping which increases the permeability of the $H_2$. Redoping with 0.01M HCl further increases the separation factor by lowering the $N_2$ permeability. Redoping with 0.02M HCl greatly enhances the separation factor by further decreasing the permeability of $N_2$.

TABLE 4

| | Permeabilities (Barrers) | | | |
|---|---|---|---|---|
| Gas | As-cast Film | Doped/ Undoped | Redoped 0.01M | Redoped 0.02M |
| He | 9.20 | 13.5 | 5.11 | 3.78 |
| $H_2$ | 8.37 | 13.5 | 3.93 | 2.61 |
| $N_2$ | 0.0569 | 0.0502 | 0.00759 | <0.002 |

| | Separation Factors | | | |
|---|---|---|---|---|
| Gas | As-cast Film | Doped/ Undoped | Redoped 0.01M | Redoped 0.02M |
| $H_2/N_2$ | 147.1 | 268.9 | 517.8 | >1305 |

Table 5 shows that using different dopant species leads to different permeabilities. Using 4M HF, HCl and HBr to dope the polyaniline membrane and then undoping with 1M $NH_4OH$ leads in all cases to higher permeabilities for small gases relative to the as-cast film. HF appears to be the most effective dopant at opening pores and improving connectivity as the highest He and $H_2$ permeabilities are found. HCl is the next most effective dopant, followed by HBr. Doping polyaniline in a 4M HI solution for 4 hours followed by undoping has only a small effect on gas permeabilities.

TABLE 5

| Effects of Protonic Acid Dopants on Polyaniline Membranes Permeabilities (Barrers) | | | | | |
|---|---|---|---|---|---|
| Gas | As-Cast Film | Doped/ Undoped 4M HCl | Doped/ Undoped 4M HF | Doped/ Undoped 4M HBr | Doped/ Undoped 4M HI |
| He | 9.52 | 18.1 | 27.8 | 13.2 | 8.30 |
| $H_2$ | 8.79 | 17.6 | 28.0 | 13.7 | 8.17 |
| $CH_4$ | 0.0156 | 0.0172 | 0.526 | 0.00893 | 0.02 |
| $CO_2$ | 2.00 | 2.60 | 10.2 | 2.34 | 1.87 |
| Ar | 0.121 | 0.183 | 0.758 | 0.116 | 0.113 |
| $O_2$ | 0.413 | 0.546 | 1.82 | 0.380 | 0.356 |
| $N_2$ | 0.0671 | 0.0631 | 0.378 | 0.0318 | 0.0472 |

| | Separation Factors | | | | |
|---|---|---|---|---|---|
| Gas Mixture | As-Cast Film | Doped/ Undoped 4M HCl | Doped/ Undoped 4M HF | Doped/ Undoped 4M HBr | Doped/ Undoped 4M HI |
| $H_2/N_2$ | 131.0 | 278.9 | 74.1 | 430.8 | 173.1 |
| $O_2/N_2$ | 6.2 | 8.7 | 4.8 | 11.9 | 7.5 |
| $CO_2/CH_4$ | 128.2 | 151.2 | 21.5 | 262.0 | 93.5 |

Table 6 shows the effects of curing time on permeabilities of the polyaniline membranes. Large effects are not seen, except that the longer cure times tend to make the films more rigid and less susceptible to improvements by doping/undoping. Hence, the separation factors for the 6 hour cured films did not improve greatly on doping/undoping when compared to the 2 hour and 3 hour cured films. The 3 hour cured films showed the greatest improvement after doping/undoping.

TABLE 6

| Effect of Cure Time on Permeabilities of Polyaniline Membranes Permeabilities (Barrers) | | | |
|---|---|---|---|
| Gas | 2 Hour Cure | 3 Hour Cure | 6 Hour Cure |
| He | 9.52 | 3.89 | 5.36 |
| $H_2$ | 8.79 | 3.08 | 4.65 |
| $CH_4$ | 0.0156 | 0.0233 | 0.0324 |
| $CO_2$ | 2.00 | 0.421 | 0.952 |
| Ar | 0.121 | 0.0612 | 0.195 |
| $O_2$ | 0.413 | 0.141 | 0.225 |
| $N_2$ | 0.0671 | 0.0149 | 0.0593 |

| | Separation Factors | | |
|---|---|---|---|
| Gas | 2 Hour | 3 Hour | 6 Hour |
| $H_2/N_2$ | 131.0 | 206.7 | 78.4 |
| $O_2/N_2$ | 6.2 | 9.5 | 3.8 |
| $CO_2/CH_4$ | 128.2 | 18.1 | 29.4 |

| After Doping/Undoping Permeabilities (Barrers) | | | |
|---|---|---|---|
| He | 18.1 | 11.2 | 7.54 |
| $H_2$ | 17.6 | 11.6 | 6.66 |
| $CH_4$ | 0.0172 | 0.00387 | 0.0129 |
| $CO_2$ | 2.6 | 1.30 | 0.559 |
| Ar | 0.183 | 0.0143 | 0.0296 |
| $O_2$ | 0.546 | 0.200 | 0.0984 |
| $N_2$ | 0.0631 | 0.00154 | 0.0169 |

| Separation Factors | | | |
|---|---|---|---|
| $H_2/N_2$ | 278.9 | 7532.5 | 394.1 |
| $O_2/N_2$ | 8.7 | 129.9 | 5.8 |
| $CO_2/CH_4$ | 151.2 | 335.9 | 0.1 |

Table 7 reports the results achieved through the use of 1M tosylic anhydride as Lewis acid dopant. A film of emeraldine base was soaked for 4 hours in a 1M ethanolic solution of tosylic anhydride. The film was then soaked for 2 hours in a solution comprising 0.5M tosylic anhydride in a 1:1 mixture of water and ethanol. The film was compensated (i.e., undoped) with 1M ammonium hydroxide for 6 hours, washed with deionized water, dried under dynamic vacuum for 12 hours, and then evaluated for gas permeability.

TABLE 7

| Effects of Lewis Acid Dopant on Polyaniline Membranes Permeabilities (Barrers) | | |
|---|---|---|
| Gas | As-cast Film | Doped/Undoped |
| He | 9.52 | 10.9 |
| $H_2$ | 8.79 | 9.68 |
| $CH_4$ | 0.0156 | 0.0174 |
| $CO_2$ | 2.00 | 1.86 |
| Ar | 0.121 | 0.113 |
| $O_2$ | 0.413 | 0.411 |
| $N_2$ | 0.0671 | 0.0504 |

| | Separation Factor | |
|---|---|---|
| Gas Mixture | As-Cast Film | Doped/Undoped |
| $H_2/N_2$ | 31.0 | 192.1 |
| $O_2/N_2$ | 6.2 | 8.2 |
| $CO_2/CH_4$ | 128.2 | 106.9 |

The very large separation factors possible with optimized polyaniline membranes in accordance with the present invention may be calculated from the data reported in Tables 1-6. For example, the largest permeabilities have been achieved for $H_2$, $CO_2$ and $O_2$ using 4M HF doping/undoping of polyaniline (Table 5). Very small permeabilities for $CH_4$ and $N_2$ have been achieved by redoping a previously 4M HCl doped/undoped membrane with 0.02M HCl (Table 3). Combining this data gives potential separation factors of >14,000 for $H_2/N_2$, >910 for $O_2/N_2$ and >5100 for $CO_2/CH_4$, as given in Table 8. Although the redoping process may lower slightly the permeability of $H_2$, $CO_2$ and $O_2$ (which in turn reduces the separation factors), it is readily seen how straightforward optimization procedures based on the concepts described herein can be exploited to provide membranes with enormous separation factors.

TABLE 8

Potential Polyaniline Membrane Separation Factors
(HF doping/undoping followed by 0.02M HCl)
Observed Permeabilities

| HF doping/undoping | | 0.02M HCl redoping | |
|---|---|---|---|
| $H_2$ | 28.0 | $CH_4$ | <0.002 |
| $CO_2$ | 10.2 | $N_2$ | <0.002 |
| $O_2$ | 1.82 | | |

Potential Separation Factors

| | |
|---|---|
| $H_2/N_2$ | >14,000 |
| $O_2/N_2$ | >910 |
| $CO_2/CH_4$ | >5,100 |

EXAMPLE 3

Preparation and Use of Modified Dimethoxyparaphenylene vinylene (DMPPV) Film

The dopable conjugated polymer dimethoxyparaphenylene vinylene (DMPPV) has been described in the literature [Murase, I. et al., Polymer Commun. 26:362 (1985); Jen, K.-Y. et al., Synth. Metals 22:179 (1987)]. The sulfonium salt polymer precursor to DMPPV was prepared according to Murase et al. by reaction of dimethyl sulfide and 2,5-dimethoxy-p-xylylene dichloride in water with slow addition of base at 5° C. The as-formed precursor sulfonium salt polymer was filtered, washed and then dried under dynamic vacuum. The dried precursor powder was then dissolved in water as a 5% solution and cast on glass plates. This thin film was dried at room temperature under an atmosphere of argon for 2 days. A coherent film of DMPPV was obtained by curing the precursor film at 200° C. for 45 minutes; this process released gaseous HCl and dimethyl sulfide. The thus-prepared film of DMPPV was evaluated for gas permeability. As indicated in Table 9, this fully dense film has a baseline ability to separate gases based on kinetic diameter. The film was then chemically treated by immersion of the film in an anhydrous solution of 0.10M $FeCl_3$ in nitromethane for 1 hour. The film was then compensated (undoped) with 1M ammonium hydroxide for 3 hours, washed with deionized water, dried under dynamic vacuum for 12 hours, and then evaluated for gas permeability. As the results reported in Table 9 demonstrate, the doping/redoping procedure improves connectivity and increases permeability for all gases tested.

TABLE 9

DMPPV Membranes
Permeabilities (Barriers)

| Gas | As-Cast Film | Doped/Undoped Film |
|---|---|---|
| He | 13.2 | 22.3 |
| $H_2$ | 17.9 | 28.4 |
| $CH_4$ | 0.265 | 1.21 |
| $CO_2$ | 10.6 | 29.8 |
| Ar | 0.605 | 2.01 |
| $O_2$ | 1.6 | 4.17 |
| $N_2$ | 0.301 | 0.889 |

Separation Factors

| Gas Mixture | As-Cast Film | Doped/Undoped Film |
|---|---|---|
| $H_2/N_2$ | 59.5 | 31.9 |
| $O_2/N_2$ | 5.3 | 4.7 |
| $CO_2/CH_4$ | 40.0 | 24.6 |

The test samples were stable for several weeks, after which they cracked. By following a redoping procedure in accordance with a preferred embodiment of the present invention, the permeability of the membrane to large gases may be decreased and higher separation factors obtained.

EXAMPLE 4

Comparison of Single-Stage Permeator Performance in Separation of Nitrogen From Air A comparison of membrane performance in the separation of nitrogen from air in a single-stage permeator is made between an ethyl cellulose membrane (with a reported separation factor $\alpha$ for $O_2/N_2$ of 3.4) and two polyaniline membranes in accordance with the present invention: an as-cast polyaniline membrane prepared in accordance with the method of Example 1 with $\alpha=9.5$ (as reported in Tables 2 and 3); and an optimized polyaniline membrane prepared in the manner employed for the samples described in Table 3 (a redoping with 0.02M HCl) with $\alpha=32$ (when tested at 120 psi feed pressure). A feed rate of 120,000 ft$^3$/hr, an $O_2/N_2$ composition ratio i in the feed of 0.266 (corresponding to the ratio in air) and a desired $O_2/N_2$ composition ratio i in the raffinate of 0.052 (i.e., a raffinate comprising 95.1% nitrogen) were assumed. The composition of the permeate, the stage cut (percentage of total feed that is permeated) and the surface area of a membrane having a thickness of 0.0254 mm required to allow the calculated flux rate (from the measured pure gas permeabilities) were calculated using flow-balanced transport equations for laminar-flow conditions in a single-stage membrane permeation system, in accordance with the method described for an ethyl cellulose membrane by Weller and Steiner [Weller, S. and W. A. Steiner, J. Appl. Phys. 21:279 (1950), the entire disclosure of which is hereby incorporated by reference]. The membrane is assumed to be a flat sheet mounted in a module with a feed side chamber and a permeant side chamber. The feed flows parallel to the upstream side of the membrane; the raffinate is removed at the other side of the feed side chamber. The permeant diffuses normal (i.e., perpendicular) to the membrane surface in cross-flow and collects in the permeant side chamber on the downstream side of the membrane. The calculations also require specifying the feed pressure and permeant pressure; for this set of calculations, these are set at 8 atmospheres (120 psi) and 1 atmosphere, respectively. The permeant is to be fed directly and continuously into a burner at this pressure to enhance combustion, but other oxygen applications might require recompression. The raffinate is recovered continuously at essentially 8 atmospheres for use as inert blanketing gas.

The flow calculations require the following inputs: feed pressure, permeant pressure, feed composition, raffinate composition, feed mixture flow rate and membrane separation factor. To calculate the surface area required for the permeant flowrate, the film thickness and the permeability of the membrane for one of the components (preferably, under similar pressure conditions) must be known. The oxygen permeability of ethyl cellulose is 9.6 Barrers; the film thickness was 0.0254 cm. The permeability for the as-cast polyaniline film is as reported in Example 2; the film thickness was 0.0112 cm. The optimized film had been redoped with 0.02M HCl and cured for 3 hours; this sample had an oxygen permeability of 0.114 Barrers at 120 psi feed pressure and a film thickness of 0.0112 cm. The results of these calculations are reported in Table 10.

TABLE 10

Single-Stage Membrane Permeator Performance
Ethyl Cellulose
alpha ($O_2/N_2$) = 3.4

|  | n(feed) | n(raff) | n(perm) | stage cut | area(ft$^2$) |
|---|---|---|---|---|---|
| total (ft$^3$/hr) | 120000 | 73751 | 46003 | 38.3 | 7.71 × 10$^6$ |
| $O_2$ (ft$^3$/hr) | 25135 | 3645 | 21490 | | |
| $N_2$ (ft$^3$/hr) | 94619 | 70105 | 24513 | | |
| i ($O_2/N_2$) | 0.266 | 0.052 | 0.877 | | |
| $O_2$ (%) | 20.9 | 4.9 | 46.7 | | |
| $N_2$ (%) | 78.8 | 95.1 | 53.3 | | |

Polyaniline - As Cast
alpha ($O_2/N_2$) = 9.5

|  | n(feed) | n(raff) | n(perm) | stage cut | area(ft$^2$) |
|---|---|---|---|---|---|
| total (ft$^3$/hr) | 120000 | 97414 | 32340 | 27.0 | 2.26 × 10$^8$ |
| $O_2$ (ft$^3$/hr) | 25135 | 4321 | 20814 | | |
| $N_2$ (ft$^3$/hr) | 94619 | 83093 | 11526 | | |
| i ($O_2/N_2$) | 0.266 | 0.052 | 1.806 | | |
| $O_2$ (%) | 20.9 | 4.9 | 64.4 | | |
| $N_2$ (%) | 78.8 | 95.1 | 35.6 | | |

Polyaniline - Optimized
alpha ($O_2/N_2$) = 32

|  | n(feed) | n(raff) | n(perm) | stage cut | area(ft$^2$) |
|---|---|---|---|---|---|
| total (ft$^3$/hr) | 120000 | 95002 | 24752 | 20.6 | 2.72 × 10$^8$ |
| $O_2$ (ft$^3$/hr) | 25135 | 4696 | 20439 | | |
| $N_2$ (ft$^3$/hr) | 94619 | 90306 | 4313 | | |
| i ($O_2/N_2$) | 0.266 | 0.052 | 4.739 | | |
| $O_2$ (%) | 20.9 | 4.9 | 82.6 | | |
| $N_2$ (%) | 78.8 | 95.1 | 17.4 | | |

As is apparent from Table 10, the membranes of the present invention permit the production of useful raffinate and a useful permeant (comprising 64.4% oxygen with the asformed polyaniline membrane and 82.6% oxygen with the optimized membrane) simultaneously in a single pass. As the membranes of the invention are much more selective for nitrogen than is the ethyl cellulose membrane, the stage cut is significantly lower for the inventive membranes; as the separation factor increases, the amount of permeant decreases but the percentage of oxygen in the permeant increases. As a consequence, the surface area required to allow the calculated flux rate is correspondingly increased. By modifying the permeability in accordance with the teachings of the present invention, it is possible to adjust the separating ability to a desired level for a particular desired flux rate.

What is claimed is:

1. A method for separating a component from a mixture comprising same, which method comprises:
   bringing said mixture into contact with a membrane at a first side thereof, said membrane having selective permeability and comprising a layer of at least one fully dense dopable polymer, wherein said layer has an average pore size distribution of less than about 20 Angstroms in diameter and a density as formed of at least 90% of theoretical density, said layer being characterized by a network of interconnected porosity; and
   recovering a product enriched in said component at a second, opposite side thereof.

2. A method according to claim 1, wherein said mixture comprises at least two gases.

3. A method according to claim 2, wherein said at least two gases are selected from the group consisting of He, $H_2$, $CH_4$, $CO_2$, Ar, $O_2$ and $N_2$.

4. A method according to claim 1, wherein said fully dense dopable polymer has an at least partially conjugated pi electron system.

5. A method according to claim 1, wherein said fully dense dopable polymer comprises polyaniline.

6. A method according to claim 5, wherein said polyaniline is in an emeraldine oxidation state.

7. A method according to claim 6, further comprising at least one dopant in an amount effective to modify the permeability of said polymer as formed.

8. A method according to claim 7, wherein said at least one dopant is present in a concentration of about 0.005 to about 50 mol % per repeating unit of said polymer.

9. A method according to claim 8, wherein said at least one dopant is selected from the group consisting of Lewis acids, Bronsted acids, inorganic ions and organic ions.

10. A method according to claim 9, wherein said at least one dopant is a Lewis acid.

11. A method according to claim 10, wherein said Lewis acid comprises a halide anion.

12. A method according to claim 11, wherein the membrane is prepared by reversible doping of a fully dense dopable polymer with a first at least one dopant.

13. A method according to claim 12, wherein said polymer is further treated to remove at least a portion of said first at least one dopant to provide a substantially undoped polymer.

14. A method according to claim 13, wherein said substantially undoped polymer is further treated to introduce a second at least one dopant.

15. A method according to claim 14, wherein said first at least one dopant and said second at least one dopant are different.

16. A method according to claim 15, wherein each of said first at least one dopant and said second at least one dopant is independently selected from the group consisting of Lewis acids, Bronsted acids, inorganic ions and organic ions.

* * * * *

UNITED STATES PATENT AND TRADEMARK OFFICE
CERTIFICATE OF CORRECTION

PATENT NO. : 5,358,556
DATED : October 25, 1994
INVENTOR(S) : Richard B. Kaner, et al.

It is certified that error appears in the above-indentified patent and that said Letters Patent is hereby corrected as shown below:

On title page, after item [22], insert:
--Related U.S. Application Data
Continuation-in-part of Ser. No. 573,950, Aug. 28, 1990.--

Column 5, line 65, replace "dopent" with --dopant--.

Column 6, line 5, replace "these" with --those--.

Signed and Sealed this

Twenty-fifth Day of April, 1995

Attest:

BRUCE LEHMAN

Attesting Officer            Commissioner of Patents and Trademarks

UNITED STATES PATENT AND TRADEMARK OFFICE
CERTIFICATE OF CORRECTION

PATENT NO. : 5,358,556
DATED : October 25, 1994
INVENTOR(S) : Richard B. Kaner, et al.

It is certified that error appears in the above-indentified patent and that said Letters Patent is hereby corrected as shown below:

On the title page, item [22], insert --PCT-- before "Filed" and replace "February 25, 1993" with --August 27, 1991--.

Title page, below item [22], insert the following:

--[86] PCT No.:     PCT/US91/06120
§371 Date: Feb. 25, 1993
§102(e) Date: Feb. 25, 1993
[87] PCT Pub. No. WO92/03217
PCT Pub. Date: Mar. 5, 1992
Related to U.S. Application Data
[63] Continuation-in-part of Ser. No.
573,950, Aug. 28, 1990, U.S. Pat. No.
5,096,586, issued Mar. 17, 1992--

Signed and Sealed this

Thirteenth Day of June, 1995

Attest:

BRUCE LEHMAN

Attesting Officer            Commissioner of Patents and Trademarks